May 20, 1930.   R. STEUDTE   1,759,596
BLOTTER ATTACHMENT FOR FOUNTAIN PENS
Filed Aug. 12, 1927
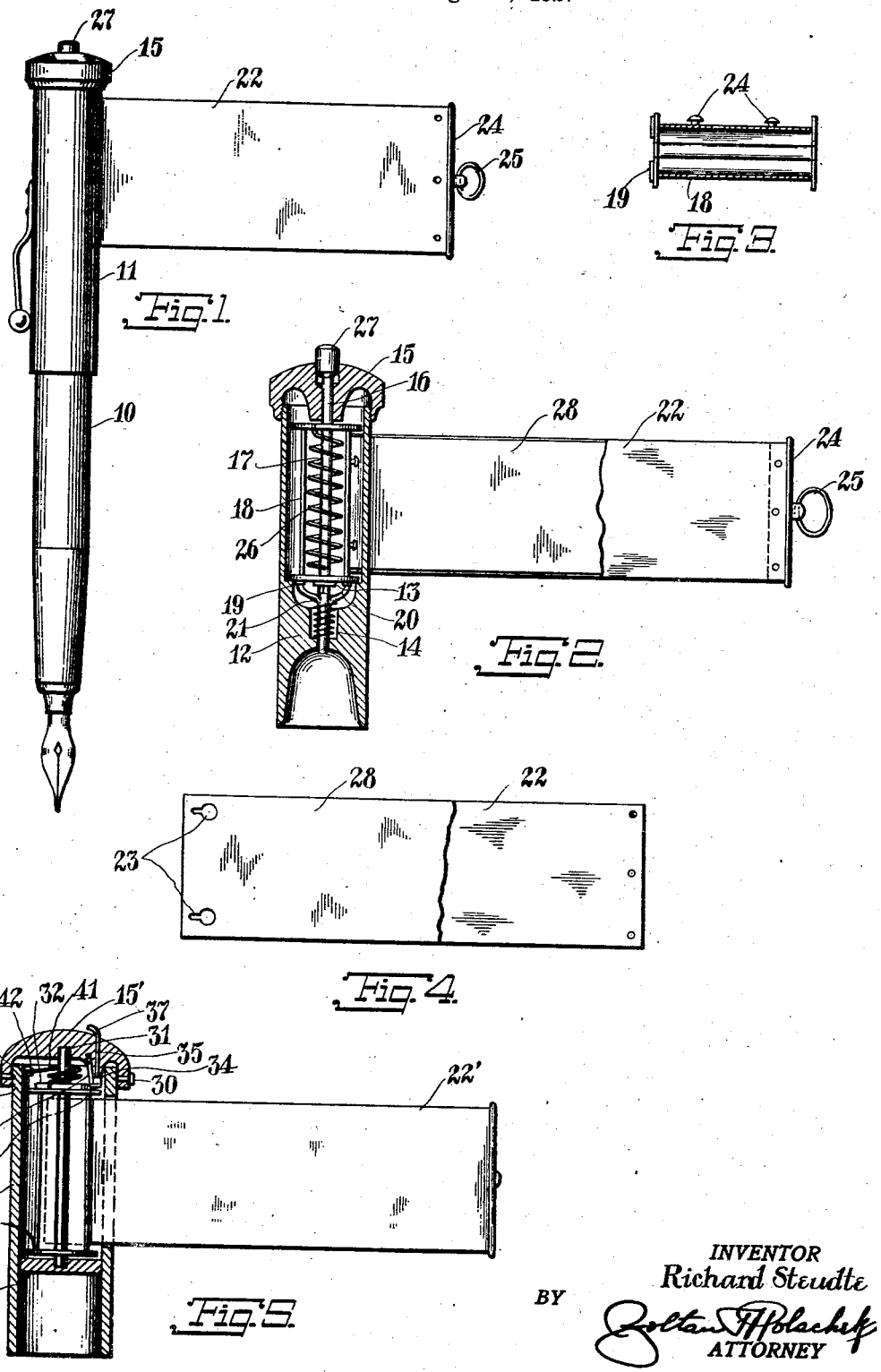
INVENTOR
Richard Steudte Patented May 20, 1930

1,759,596

UNITED STATES PATENT OFFICE

RICHARD STEUDTE, OF NEW YORK, N. Y.

BLOTTER ATTACHMENT FOR FOUNTAIN PENS

Application filed August 12, 1927. Serial No. 212,436.

This invention relates to a blotter attachment for fountain pens, and has for its object the provision of mechanism for retaining a blotter in the cap of a fountain pen.

Another object of my invention is the provision of means for automatically rolling up a blotter in a fountain pen cap.

A still further object of my invention is the provision of a means for projecting a blotting element from a fountain pen cap when desired.

Other objects will appear hereinafter the novel features and combinations being more clearly set forth in the appended claims.

In the drawing:

Fig. 1 is a perspective view of a fountain pen embodying my invention.

Fig. 2 is a longitudinal sectional view of a fountain pen cap embodying my invention.

Fig. 3 is a detail plan view of a spool employed in my blotting device.

Fig. 4 is a detail plan view of a blotter pad employed in my invention.

Fig. 5 is a longitudinal sectional view of a fountain pen cap equipped with a further development of my invention.

Referring particularly to Figs. 1 and 2 of the drawing, the numeral 10 designates a fountain pen body having a cap 11 thereon. The cap 11 is substantially tubular in form and is provided intermediate its ends with a partition 12 having a central square aperture 12ª therethrough. Recesses 13 and 14 are formed in the upper portion of the partition 12 and are communicative with each other and with the central aperture. A top member 15 is screw threaded on the tubular cap 11 and is provided with a central aperture 16 which is in alignment with the central aperture of the partition 12. A rod 17 is slidably mounted in the aperture 16 of the top member 15 and disposed centrally through the tubular cap 11 and through the aperture of the partition 12. It should be understood that the rod 17 is of square cross section at its lower end portion and that the aperture 12ª of the partition 12 is also square in section and of suitable size to restrain rotation of the rod while permitting the same to move longitudinally relative to the cap 12.

A spool 18 is rotatively mounted on the rod 17 and is disposed in the space above the partition 12. This spool is provided with a plurality of teeth 19 on its lower end surface which are adapted to be engaged by the ends of the arms 20 of the rod 17 for restraining the spool 18 from rotation. A spring 21 is disposed in the lowermost recess 14 of the partition 12 and engaged against the arms 20 of the rod 17 for urging the arms and the rod upon which they are mounted upwardly for holding the spool in a set position. A blotter pad 22 shown in Figs. 1, 2 and 4 is provided with apertures 23 through which projections 24 on the spool may be inserted for attaching the blotter pad to the spool 18. It should be understood that the cap 11 is provided with a slot which commences at its upper extremity through which the blotter pad 22 is extended. A cleat 24 having a handle member 25 thereon is attached to the outer extremity of the pad 22 for preventing the same to be drawn completely within the tubular cap 11 when the blotter is wound on the spool in the manner hereinafter disclosed.

Normally the blotter pad 22 is coiled or wound on the spool 18 and only the cleat and handle 24 and 25, respectively, of the pad are positioned out of the cap 11. A spring 26 is disposed around the rod 17 within the spool 18 and is attached at one extremity to the spool and at its other extremity to the rod 17. The blotter pad 22 may be extended from within the cap 11 by grasping the handle 25 and pulling outwardly thereon while depressing the enlarged end 27 of the rod 17 for moving the latter downwardly against the action of the spring 21 to disengage the arms 20 from the teeth 19 of the spool 18. During the extending separation of the pad 22 the spring 26 is tensioned and tends to rotate the spool in clockwise direction. When the enlargement 27 of the rod 17 is released after the blotter 22 has been suitably extended the arms 20 reengage the teeth 19 and restrain the spool 18 from rotation while the blotter is being used. When it is desired that the blotter pad be rewound on the spool after being used, the rod 17 may be depressed against the action of the spring 21 as above described for disengaging the arms 20 from the teeth 19 so as to render the spool free to be rotated by the spring 26. As the spool 18 rotates the blotter pad 22 is wound thereon and rapidly drawn into the cap 11.

It should be understood that the blotting pad may comprise a base portion of fabric or leather with a paper blotter mounted thereon and that if desired a piece of blank or ruled note paper 28 may be secured to the blotter pad at one side thereof for providing a note pad in the fountain pen cap.

In the modified form of my invention shown in Fig. 5, the fountain pen cap 11' comprises a tubular member having a partition 12' therein intermediate its ends and a top element 15' which is rotatively mounted on the upper extremity of the cap 11'. The sides of the tubular cap 11 are provided with a groove 29 into which the ends of the pins 30, mounted in the top element, extend for securely attaching the latter to the cap 11'. A rod 31 is rotatively journaled at one extremity in an aperture in the partition 12' and at its other extremity in an aperture in the top element 15' and is disposed centrally of the tubular cap 11'. The rod 31 is provided with a spool 18' which is rigidly mounted thereon and is adapted to rotate together with the rod. A ratchet wheel 32 is mounted on the upper end of the spool 18' and is adapted to be engaged by a pawl 33 which is mounted on a pawl carrier 34. A blotter 22' is attached at one of its ends on the spool 18'. The pawl carrier 34 is secured to a rod 35 journaled in the top element 15' and a leaf spring 36 is attached at one extremity to the top element 15' and engaged at its other extremity with the pawl 33 for urging the latter against the ratchet wheel 32. A handle 37 is provided on the rod 35 by which the pawl and pawl carrier may be rotated against the action of the spring 36 for disengaging the pawl 33 from the ratchet wheel 32.

In the operation of the device shown in Fig. 5, the blotter is normally wound on spool 18' and during the extending, the spring 41 is tensioned for tending to rotate the spool for rewinding the blotter but the pawl 33 urged by the leaf spring 36 restrains the spool 18' from its rewinding while the blotter is being used. After use, the handle 37 may be moved for releasing pawl 33 from the ratchet wheel 32 freeing the spool which may then be rotated by spring 41. The rotation of the spool 18' causes the blotter 22' to be wound therein and be drawn into the cap 11'.

Having thus fully shown and described an embodiment of my invention, what is desired to be secured by Letters Patent of the United States is:

1. A blotter attachment for fountain pens, comprising a spool rotatively mounted in the cap of a fountain pen, a ratchet wheel mounted on the upper end of the spool, a top element rotatively and removably mounted on the said cap and arranged for assuming fixed positions, a rod journaled in the top element and extending beyond the top surface of the top element, a pawl carrier secured on the rod, a pawl mounted on the pawl carrier and engaging the said ratchet wheel, a blotter member attached on the said spool, and a spiral spring automatically revolving said spool upon turning the said rod for disengaging the pawl from the ratchet wheel.

2. A blotter attachment for fountain pens, comprising a spool rotatively mounted in the cap of a fountain pen, a ratchet wheel mounted on the upper end of the spool, a top element rotatively and removably mounted on the said cap and arranged for assuming fixed positions, a rod journaled in the top element, a pawl mounted on the rod and engaging the said ratchet wheel, a blotter member attached on the said spool, and a spiral spring automatically revolving said spool upon turning the said rod for disengaging the pawl from the ratchet wheel.

In testimony whereof I have affixed my signature.

RICHARD STEUDTE.